(No Model.) 5 Sheets—Sheet 1.

C. DANCEL.
MACHINE FOR MAKING LEATHER BUTTON HOLE LININGS.

No. 272,376. Patented Feb. 13, 1883.

Witnesses:
N. N. Low
J. S. Barker

Inventor:
Christian Dancel
by Doubleday & Bliss
Attys.

(No Model.) 5 Sheets—Sheet 2.
C. DANCEL.
MACHINE FOR MAKING LEATHER BUTTON HOLE LININGS.
No. 272,376. Patented Feb. 13, 1883.

Witnesses:
H. N. Low
J. S. Barker

Inventor:
Christian Dancel
by Doubleday & Bliss
Attys.

(No Model.) 5 Sheets—Sheet 3.

C. DANCEL.
MACHINE FOR MAKING LEATHER BUTTON HOLE LININGS.

No. 272,376. Patented Feb. 13, 1883.

(No Model.) 5 Sheets—Sheet 4.
C. DANCEL.
MACHINE FOR MAKING LEATHER BUTTON HOLE LININGS.
No. 272,376. Patented Feb. 13, 1883.
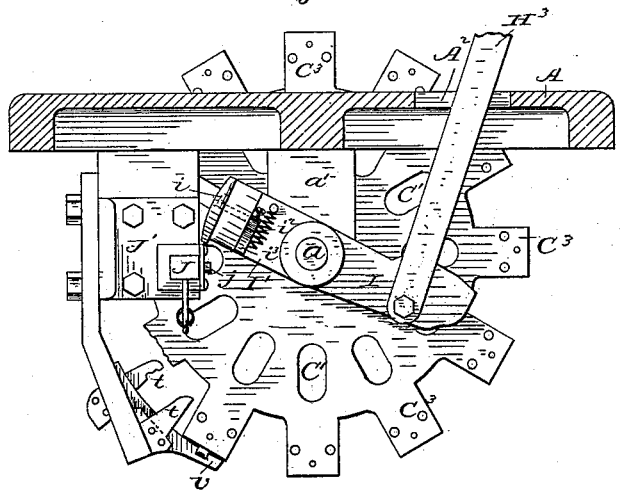
Fig. 4.
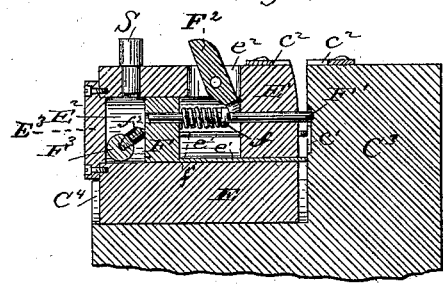
Fig. 7.
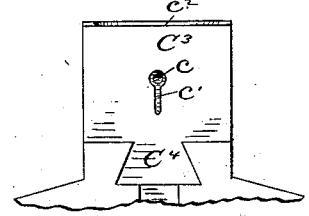
Fig. 7ª.
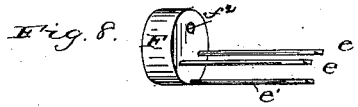
Fig. 8.
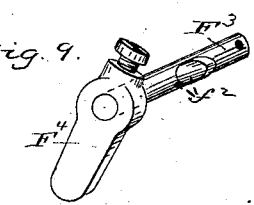
Fig. 9.
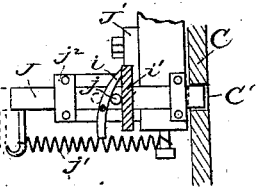
Fig. 4ª.
Witnesses:
N. W. Low
J. S. Barker
Inventor:
Christian Dancel
by Doubleday & Bliss
attys (No Model.) 5 Sheets—Sheet 5.
C. DANCEL.
MACHINE FOR MAKING LEATHER BUTTON HOLE LININGS.
No. 272,376. Patented Feb. 13, 1883.
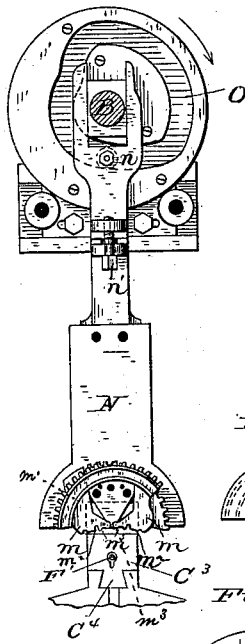
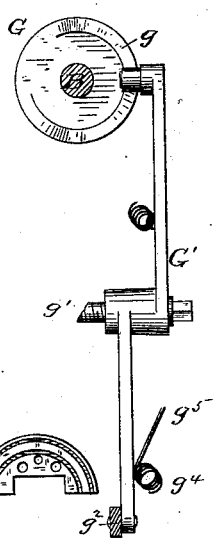
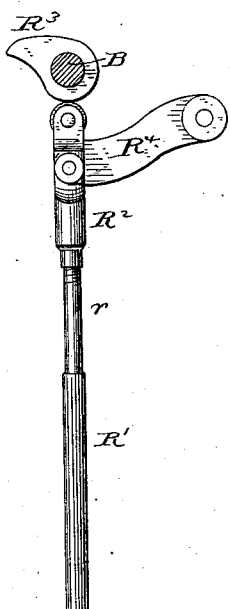
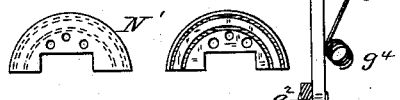
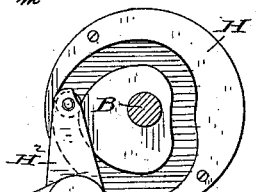
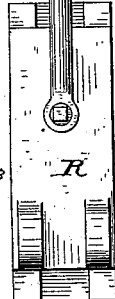
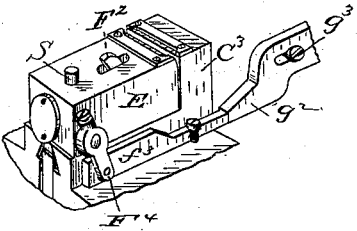
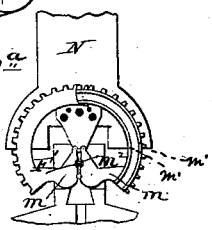
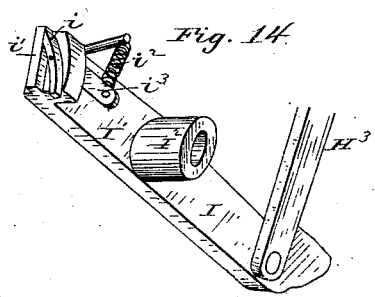
Witnesses: H. H. Low, J. S. Barker
Inventor: Christian Dancel by Doubleday & Bliss Attys

UNITED STATES PATENT OFFICE.

CHRISTIAN DANCEL, OF NEW YORK, ASSIGNOR TO THE HARRIS BUTTON HOLE COMPANY, (LIMITED,) OF BROOKLYN, N. Y.

MACHINE FOR MAKING LEATHER BUTTON-HOLE LININGS.

SPECIFICATION forming part of Letters Patent No. 272,376, dated February 13, 1883.

Application filed March 14, 1882. (No model.)

*To all whom it may concern:*

Be it known that I, CHRISTIAN DANCEL, a citizen of the United States, residing at New York, in the county of New York and State of New York, have invented certain new and useful Improvements in Machines for Making Leather Button-Hole Linings, of which the following is a specification, reference being had therein to the accompanying drawings.

Figure 1:
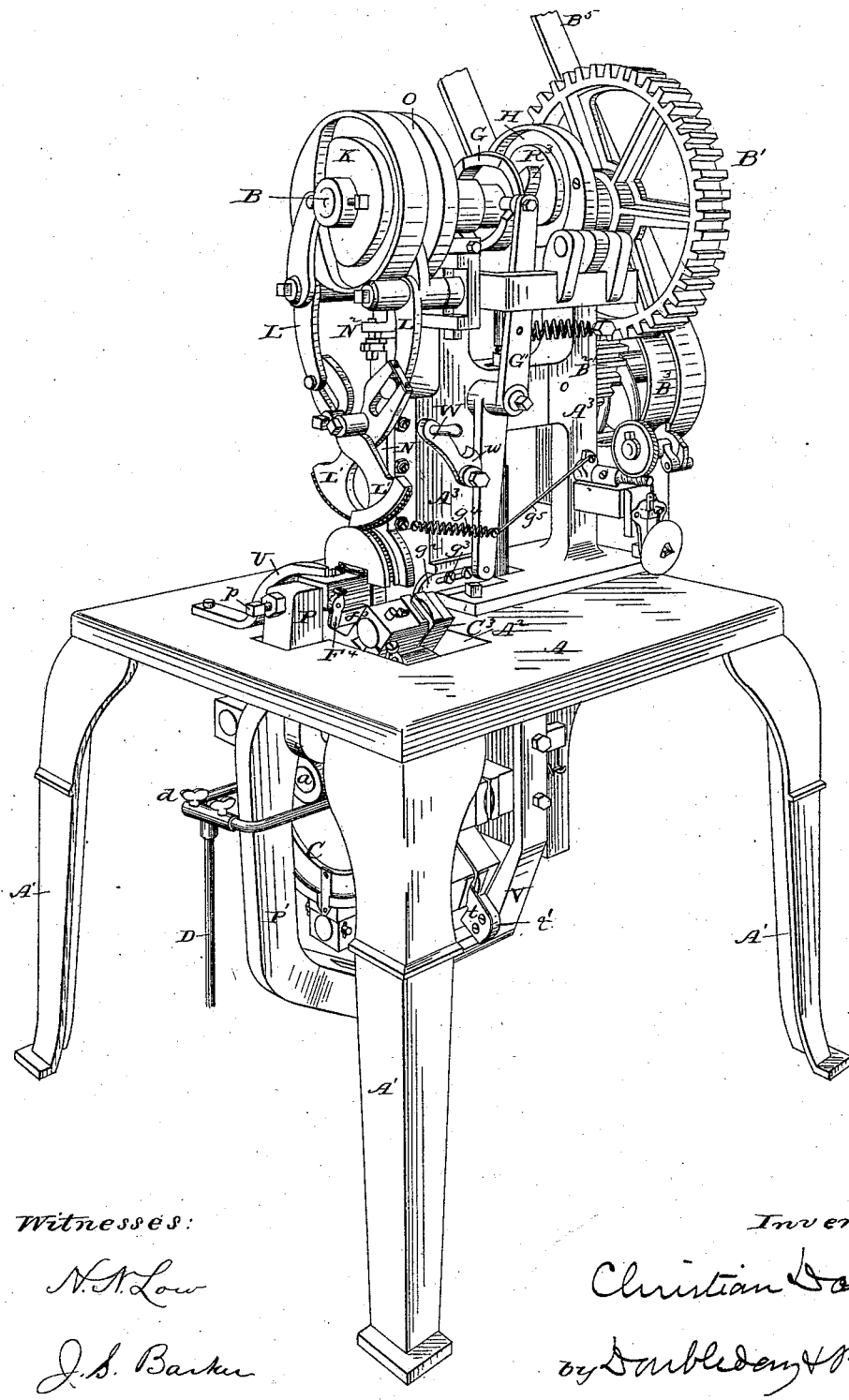
Figure 2:
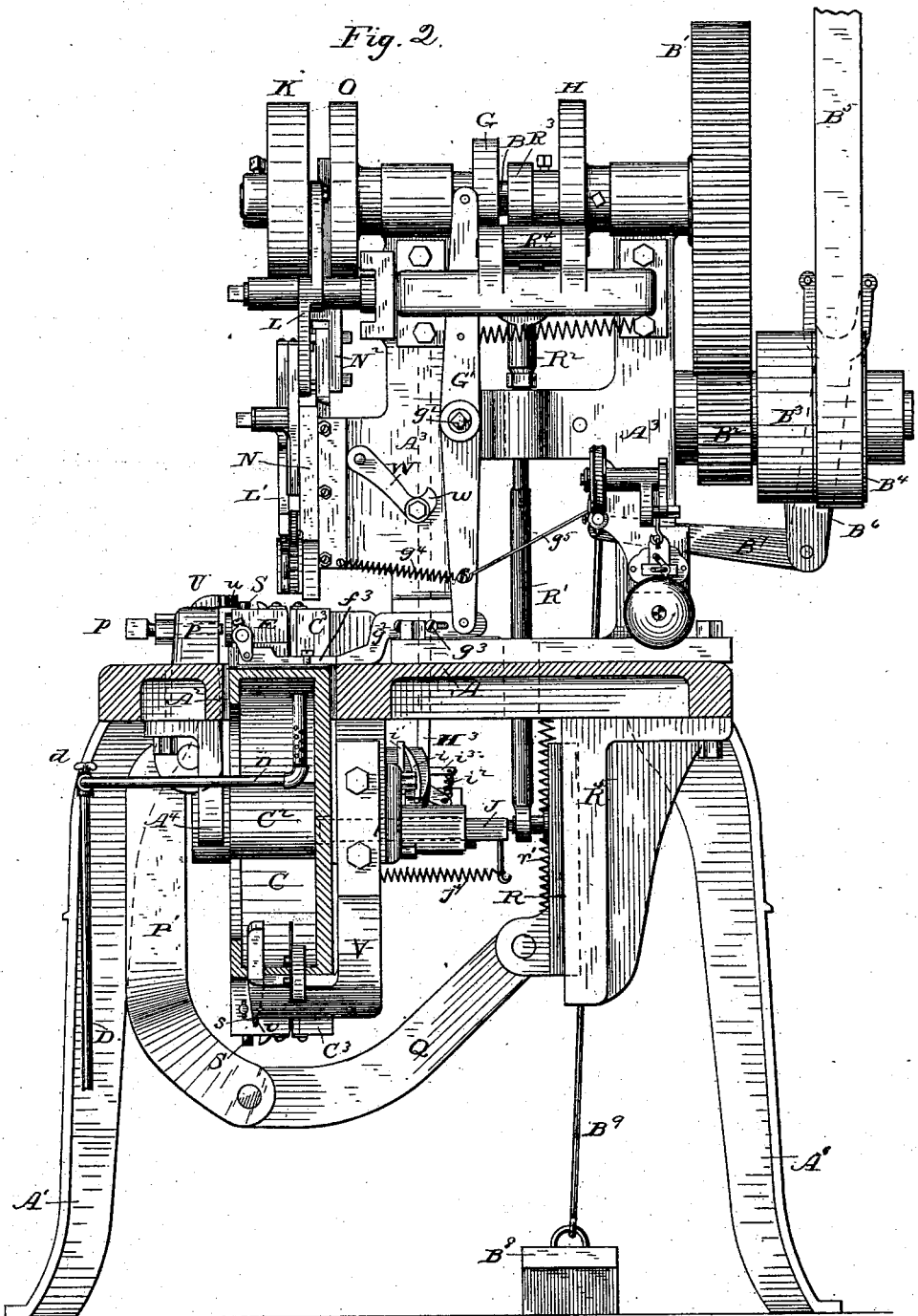
Figure 3:
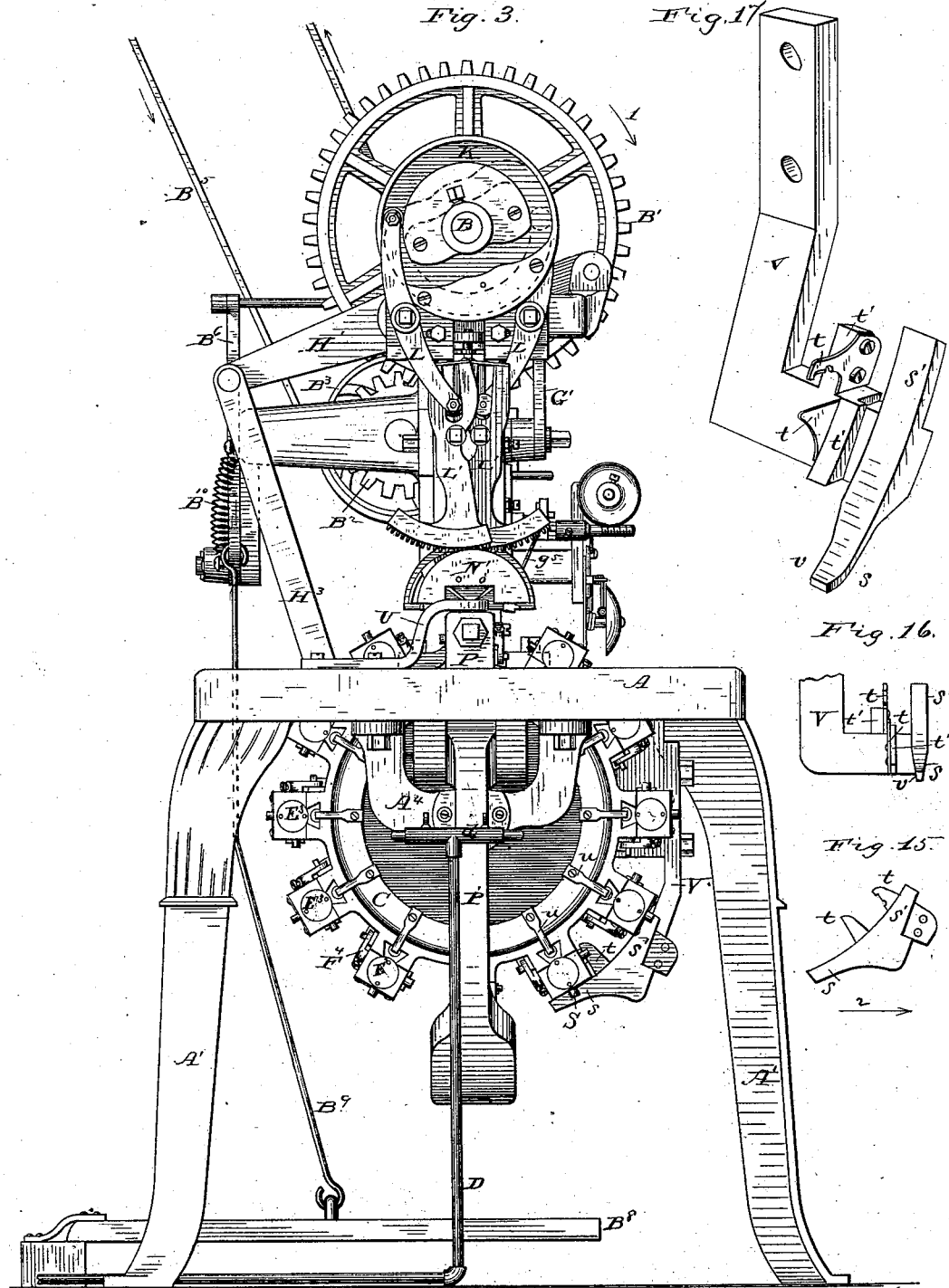

Figure 1 is a perspective view of my machine. Fig. 2 is a side view, partly in elevation and partly in section. Fig. 3 is a front view. Fig. 4 is a detached view of the revolving die-carrier and a portion of its actuating mechanism, taken from the rear. Fig. 4$^a$ is a detached view of a part of the mechanism for locking the revolving die-carrier in position. Fig. 5 is a front view of the cam and its connecting-levers for rotating the revolving die-carrier upon its pivot, the position of the carrier relative to the cam and levers being indicated in dotted lines. Fig. 6 is a perspective view, detached and enlarged, of the dies and a portion of the devices connected therewith. Fig. 7 is a vertical longitudinal section of Fig. 6, still further enlarged. Fig. 7$^a$ is a front view of one of the dies, which is rigidly attached to the revolving die-carrier. Fig. 8 is a detached view, enlarged, of the needles and the head to which they are attached. Fig. 9 represents the rock-shaft which thrusts the needles toward the permanently-attached die. Fig. 10 is a front view, enlarged, of two of the cams employed for operating the crimpers and part of the mechanism connected therewith. Fig. 11 is a clamping-plate detached. Fig. 12 shows the cam and lever which operate to thrust the needle forward. Fig. 13 is the cam-link and sliding plate which thrust the reciprocating die toward the die which is permanently attached to the revolving die-carrier. Fig. 14 is a perspective view of one of the levers shown in Fig. 5. Fig. 15 is a detached view, showing the strippers in side elevation. Fig. 16 is an elevation of the support for the strippers and certain cam or wedging faces, looking in the direction indicated by arrow 2, Fig. 15. Fig. 17 is a perspective view, detached and enlarged, of the strippers and their support.

A is the bed-plate, rectangular in form, and by preference cast partially hollow or concave on the under side, as indicated in Fig. 2, to save weight of metal. It is supported upon legs A' A', and has a rectangular slot, A$^2$, with an angular offset in it to receive the upper portion of a revolving die-carrier and a lever, to be hereinafter described.

B is the main shaft, mounted in the upper end of a standard, A$^3$, which rises from bed-plate and has a rotary motion imparted to it by gears B' B$^2$, pulley B$^3$, and belt B$^5$, which, as shown in Figs. 1 and 5, run upon a loose pulley, B$^4$, when the machine is in operation. The belt is shifted from the loose pulley to the driving-pulley, and vice versa, by means of a bell-crank lever, B$^6$ B$^7$, treadle B$^8$, link B$^9$, and a retracting-spring, B$^{10}$.

C is a revolving die-carrier, provided with a series of slots, C', arranged on a circle concentric with a horizontal pivot $a$, which projects rearwardly from a pendant or hanger, A$^4$, to a second pendant, $a'$, the pivot passing through a hub, C$^2$, attached to the rear vertical face of the die-carrier. This carrier is hollow, and has a circular opening in its front wall surrounding the pivot to permit the introduction of a gas-pipe, D, (see Fig. 2,) through which gas is introduced to heat the die-carrier and dies, to be hereinafter described. $d$ is a stop-cock in the gas-pipe. This die carrier is provided upon its rear side with a series of outwardly-projecting abutments, C$^3$, the front faces of each abutment constituting a die having a circular recess, $c$, and a shallow key-hole-shaped recess, $c'$. (See Fig. 7$^a$.)

In front of each abutment C$^3$ is a dovetailed slot, C$^4$, in which slides the horizontal dovetailed part E of a movable die, the front face, E', of which is beveled at its upper edge. Each reciprocating die is provided with a circular recess, E$^2$, and a cap, E$^3$, secured over the mouth of the recess by set-screws. (See Fig. 7.)

F is a piston-head, fitting closely the recess E$^2$ and having three needles, $e\ e\ e'$, projecting inwardly therefrom, (see Fig. 8,) the part E' of the die being perforated to receive these needles.

F' is a mandrel mounted loosely in the piston-head F and the die, and carrying a firmly-fixed collar, $f$.

$f'$ is a coiled spring interposed between collar $f$ and piston-head F.

F² is a lever pivoted in a slot in the upper part of the die at e², the lower forked end of said lever straddling mandrel F' and engaging with collar f when actuated, as hereinafter explained.

F³ is a rock-shaft mounted in the reciprocating die and provided with an arm, f², which engages with piston-head F and thrusts the needle and mandrel toward abutment C³, for a purpose which will be specified.

F⁴ is an arm secured to rock-shaft F³ outside the die. (See Fig. 6.)

f³ is a sliding bar, slotted upon one side to receive the lower end of arm F⁴.

G is a cam mounted on driving-shaft B and vibrating a lever, G', (see Fig. 2,) which is connected at its lower end to one end of sliding bar g², the opposite end of which engages with sliding bar f³.

g³ is a set-screw passing through a slot in sliding bar g², to hold it in place and permit it to be moved endwise.

g⁴ is a spiral spring connected at one end to the frame-work and at the other end to lever G'.

g⁵ is a link connecting lever G' with a registering mechanism, which may be of any usual or approved construction.

I will now describe the mechanism by which the die-carrier is rotated.

H, Figs. 1, 2, 5, is a cam mounted on driving-shaft B, and actuating a bell-crank lever, H' H². (See Figs. 3 and 5.)

H³ is a link connecting the bell-crank lever with a vibrating lever, I I', mounted on pivot a by means of a sleeve, I². Lever I I' is provided at one end with a switch, i, pivoted centrally and having its upper end held in contact with a rib, i', by means of a spring, i², operating on arm i³, which is connected with the pivot of the switch. (See Fig. 14.) The end I of this lever carries a spring-pawl, I⁴, the free end of which enters alternately the slots C' and rotates the die-carrier, as will be readily understood by an examination of Fig. 5, in which the position of the die-carrier is indicated in dotted lines, with the lever I I' shown in full lines behind the die-carrier.

J is a latch sliding in suitable ways upon the frame of the machine, (see Figs. 4, 4ª,) one end of the latch entering alternately the slots C' in the die-carrier for the purpose of locking said carrier, except at the instant that it is being rotated by the pawl I⁴. By an examination of Figs. 4, 4ª, 14, it will be readily understood that when the end I' of the lever I I' is moving upward the switch i will engage with pin j, projecting from latch J, and withdraw said latch from the slot C', and permit the rotation of the wheel, and that when the end I' of the lever is moving downward the pin j will traverse the throat upon the opposite side of the switch without moving the latch.

j' is a spring which thrusts the latch into the slot C', and j² is a plate and supporting-frame in which the latch slides.

K is a cam-grooved wheel, mounted on shaft B, the cam-grooves upon the opposite faces of the wheel being in reversed positions, so as to operate the levers L in opposite directions simultaneously. These levers are pivoted to the main frame, their lower ends engaging with the forked upper ends of segment-levers L', the toothed portions of which engage with and oscillate crimpers m m, having circular ribs or flanges m', which are mounted in suitable seat-grooves in a vertically-reciprocating carrier, N N², and in a semicircular face-plate, N', which is secured to the lower end of the sliding carrier. These crimpers are notched upon their lower working edges at m² m³ to permit the points of the needles e, e, and e' to puncture the leather for a purpose which will be explained, and to receive the mandrel F'. A vertically-reciprocating motion is imparted to the carrier N by means of a cam-grooved wheel, O, Figs. 1, 2, 10, the groove of which is traversed by a friction-roller or stud, n. The carrier is made in two sections, bolted together and adjusted relatively to each other by means of a bolt, n', which engages with lugs projecting from both sections of the carrier. The reciprocating carrier slides in a suitable way or track formed for it in the frame-work. As shown in Fig. 10, the inner ends of the lower or working edges of the crimpers are so formed as to force the leather around the mandrel F' for the purpose of forming an eye in the button-hole. (See Figs. 10, 10ª.)

c² c² are guide-plates, one end of which is attached to the reciprocating die E E' and the other to the abutment C³ to insure a proper placing of the blank, P P' is a lever pivoted to the main frame and connected by a link, Q, with a sliding plate, R, which reciprocates vertically in a standard, R', bolted to the lower side of the bed-plate.

R' R² r, Fig. 13, is a link having its lower end connected to the sliding plate R, its upper end being supported in an arm of the main frame, the part R² having a screw-threaded socket, which receives the threaded sink r of the part R'. A cam, R³, on shaft B thrusts the reciprocating plate and link downward at each revolution of the shaft.

R⁴ is a pivoted tie-bar connecting the upper end of the link with the main frame and supporting it against the lateral thrust of cam R³.

p is a set-screw passing through the upper end of lever P P' and engaging with the reciprocating die E E. At each revolution of the cam R³ the reciprocating die is thrust forcibly toward its opposing abutment C³, a returning spring, r', Fig. 2, serving to withdraw the end P of the lever from contact with the reciprocating die.

S is a pin projecting from the outer face of the reciprocating die, and provided by preference with an anti-friction roller.

s is an inclined face or wedging face arranged in the path of the pins S as the die-carrier is rotated in such position that as each pin traverses the incline it operates to thrust the die outward—that is, its opposing abutment.

t t are strippers attached to the frame in such position that as the die-carrier revolves the abutments and dies pass upon opposite sides of the teeth of the strippers, which are so arranged that one tooth shall be in close proximity to the face of the abutment and the other to the face of the reciprocating die as they pass, the reciprocating die being held away from contact with its opposing abutment—a continuation, $s'$, of the inclined face $s$, see Figs. 2, 3, 15, 16.

$v$ is an inclined face formed upon the opposite side of the metal, upon which the inclined face $s$ is formed in such position as to engage with the upper end of lever $F^2$, and thus withdraw the mandrel $F'$ from the position shown in Fig. 7.

V, Figs. 1, 2, 3, is an angular supporting-plate having attached thereto the inclined or wedging faces $s\ v$ and the strippers $t\ t$. By preference the strippers are made separate and attached to projecting ribs $t'$, (see Figs. 1, 10,) cast in one piece with the support; but in practice I usually cast the wedging-faces in one and the same piece with the supporting-plate V.

U is a stop secured to the upper face of the bed-plate, its upper end projecting above the path traversed by the dies E, with its inner edge arranged at a short distance from the circular path traversed by studs S as the dies revolve with the die-carrier.

$u\ u$ are returning-springs, their free ends engaging with the reciprocating dies E to thrust said dies toward the abutments or stationary dies $C^3$.

My machine may be operated as follows: Assuming the parts to be in the position shown in Figs. 2 and 3, a blank, consisting of a rectangular piece of leather of suitable size, is placed between the guide-plates $c^2$, when the rotation of the main shaft and its attached cams, in a direction indicated by arrow 1, Fig. 3, first forces the reciprocating carrier N and crimpers $m$ downward, folding the blank centrally and forcing it into the crevice between the reciprocating die and the abutment. As the blank is thus forced into the crevice, the spring $u$ bracing against the movable die and resisting the outward movement of the die, the leather is crimped, the extent of the crimping depending upon the thickness of the leather, it being apparent that when the stud S strikes the stop U the friction of the leather against the adjacent faces of the die and the abutments will, if the leather be of sufficient thickness, necessitate the employment of considerable force to push the blank into the crevice. After the crimpers have been forced downward by the action of cam O, cam K, acting through levers L L and segment-levers $L'\ L'$, oscillating the crimpers, causing their working-faces to approach each other and crimp the folded blank around the mandrel $F'$. The crimpers have been forced down into such position that, when thus oscillating, the notches $m^3$ force the leather around the mandrel. Cam G now, by means of lever $G'$ and sliding bar $g^2$, actuates the rock-shaft $F^3$ so as to push the needles $e\ e'$ into the folded button-hole lining and retain it in position, while the continued revolution of cams K O withdraws the crimpers into the position shown in Figs. 2 and 3, immediately after which cam $R^3$ thrusts down the plate R, and, acting through link Q and lever $P\ P'$, forces the reciprocating die E toward the abutment $C^3$, and thus presses the folded edge of the button-hole lining into the circular and key-shaped recess $c\ c'$, thus forming a bead upon the folded edge of the leather. The sliding plate is now raised by spring $r'$, when a continued rotation of the shaft B and cam H, acting through bell-crank lever $H'\ H^2$, link $H^3$, lever $I\ I'$, and pawl $I^4$, first withdraws the latch J from one of the slots in the die-carrier and then rotates it (the die-carrier) sufficiently to bring another reciprocating die and abutment immediately under the crimpers. It will of course be understood that the die-carrier, the abutments and stationary dies, and the reciprocating dies are kept hot by means of gas-jets, gas being introduced through pipe D. This operation of the machine is repeated, and, when the dies are passing the inclines $v\ s$, the engagement of the stud S and lever $F^2$ with said inclines moves the reciprocating die from the abutment, and at the same time withdraws the mandrel $F'$, thus permitting the button-hole lining to be removed from between the die and the abutment by means of the strippers, which, as has been explained, are so arranged that the lowest one will separate the button-hole lining from the abutment, and the upper one will separate it from the die, unless it (the button-hole) has previously escaped from between those parts. Subjecting the leather to the action of the heated die and abutment during the time occupied in passing from the crimpers to the strippers insures that the leather shall be properly set before being discharged from the machine. The operator can, by turning the part W of the locking-lever W $w$ into a vertical position, thrust the part $w$ against the lower end of the lever $G'$, and thus arrest the action of the registering mechanism in case the machine from any cause fails to properly crimp the leather into a button-hole lining, or if he neglects to place a blank under the crimpers before they are thrust into the crevice between the die and the abutment. The crimpers force the ends of the blank slightly past each other, so that the needle $e'$ punches the leather of one of the overlapping surfaces slightly into the other one, thus securing their ends slightly to each other, and preventing them from springing apart, as they might otherwise do after being removed from the machine.

What I claim is—

1. In a machine for making button-hole linings, a die-carrier and dies which move in an arc of a circle, in combination with vibrating crimpers, substantially as set forth.

2. In a machine for making button-hole linings, a die-carrier and dies which move in an arc of a circle, in combination with vibrating crimpers and mechanism, substantially as described, which locks the dies in position while the crimpers are acting upon the leather, substantially as set forth.

3. In a machine for making button-hole linings, a die-carrier and dies which move in an arc of a circle, in combination with vibrating crimpers and mechanism, substantially as described, which moves the dies under and past the crimpers, substantially as set forth.

4. In a machine for making button-hole linings, a die-carrier and dies which move in an arc of a circle, in combination with vibrating crimpers, mechanism which moves the dies past the crimpers, and means, substantially as described, for retaining the ends of the button-hole lining in position while the crimpers are being withdrawn, substantially as set forth.

5. In a machine for making button-hole linings, a die-carrier and dies which move in an arc of a circle, in combination with vibrating crimpers and reciprocating needles adapted to retain the ends of the button-hole lining in position while the crimpers are being withdrawn, substantially as set forth.

6. In a machine for making button-hole linings, a die-carrier and dies which move in an arc of a circle, in combination with vibrating crimpers, and a reciprocating mandrel around which the material is pressed by the crimpers, substantially as set forth.

7. In a machine for making button-hole linings, a die-carrier and dies which move in an arc of a circle, in combination with vibrating crimpers, and mechanism, substantially as described, for forcing the movable die toward the abutment or stationary die.

8. In a machine for making button-hole linings, a die-carrier and dies which move in an arc of a circle, in combination with strippers adapted to enter the crevice between the dies, substantially as set forth.

9. In a machine for making button-hole linings, a die-carrier and dies which move in an arc of a circle, in combination with mechanism, substantially as described, adapted to separate the dies to permit the escape of the button-hole lining, substantially as set forth.

10. In a machine for making button-hole linings, a die-carrier and dies which move in an arc of a circle, in combination with vibrating crimpers and springs adapted to press the reciprocating die toward the stationary dies, substantially as set forth.

11. In a machine for making button-hole linings, a die-carrier and dies which move in an arc of a circle, in combination with vibrating crimpers, and a stop adapted to support the movable die against the thrust produced by forcing the leather into the crevice between said movable die and the stationary die or abutment, substantially as set forth.

12. The combination, with the movable die E, of the mandrel F′, lever F², the returning-spring, and inclined face V, substantially as set forth.

13. The combination, with the movable die, of the stud S, and inclined face $s$, substantially as set forth.

14. The combination, with the recessed movable die, of the piston head F, the needles, the rock-shaft, the sliding bar $g^2$, cam G, and lever G′, substantially as set forth.

In testimony whereof I affix my signature in presence of two witnesses.

CHRISTIAN DANCEL.

Witnesses:
GOTTLIEB SCHULTHEIS,
ERNST REMPF.